L. H. Pfleegor,
Safety Hook.
Nº 78,996. Patented June 16, 1868.
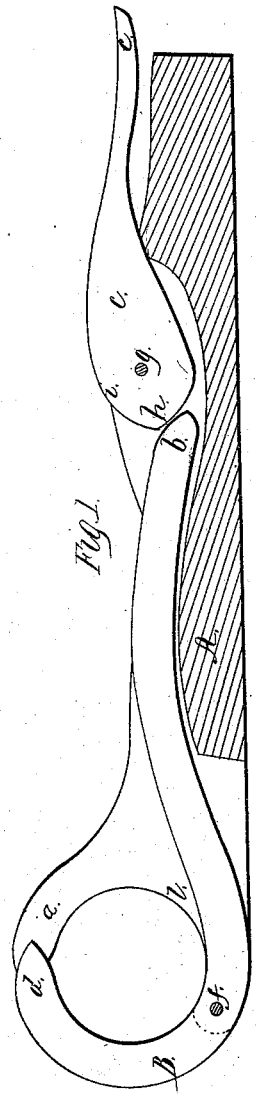
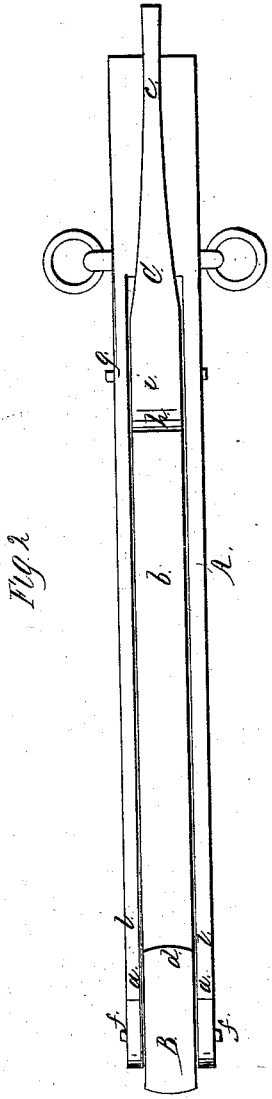
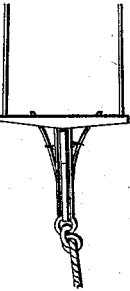
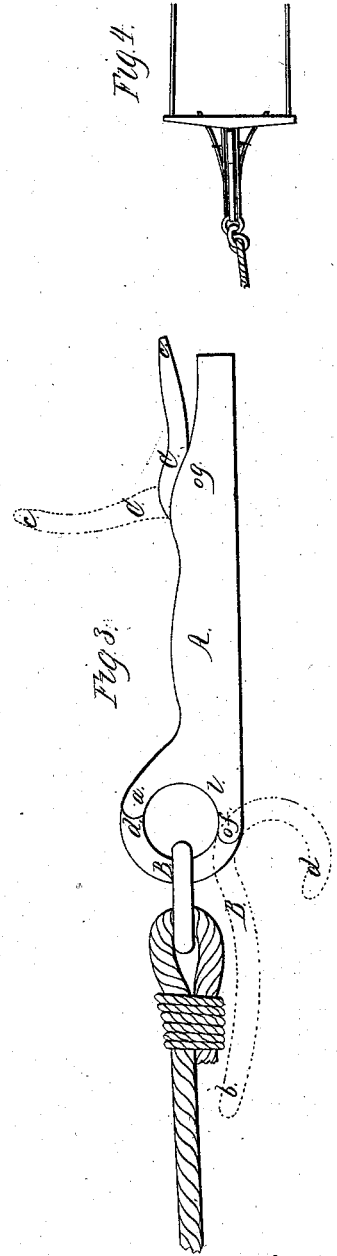
Witnesses:
Wm H. Browne
A S Van Vrunken
Inventor:
L. H. Pfleegor
by his atty
J. S. Brodu

United States Patent Office.

L. H. PFLEEGOR, OF MILTON, PENNSYLVANIA.

Letters Patent No. 78,996, dated June 16, 1868.

---

IMPROVED SAFETY-HOOK.

---

*The Schedule referred to in these Letters Patent and making part of the same.*

---

TO ALL WHOM IT MAY CONCERN:

Be it known that I, L. H. PFLEEGOR, of Milton, in the county of Northumberland, and State of Pennsylvania, have invented an Improved Safety-Hook; and I do hereby declare that the following is a full and exact description thereof, reference being had to the accompanying drawings, making part of this specification—

Figure 1 being a longitudinal section of the stock of the instrument, showing the hook and lock-lever in elevation.

Figure 2, a top view of the instrument.

Figure 3, a side view of the instrument, (on a smaller scale,) showing the hook in positions, both as closed and open.

Figure 4, a view, (on a reduced scale,) showing a method of attaching the instrument to the horse or team for drawing.

Like letters designate corresponding parts in all of the figures.

This invention is applicable to all purposes of drawing where it is desirable to suddenly release the animal while drawing, even without slacking the draught. It is more particularly intended for attaching horses or mules to the tow-ropes of canal-boats, to street-cars, &c.

The instrument is made of wrought iron, steel, or, for some uses, of malleable iron. It has a stock, A, provided with ears or bearings, $l\ l$, in which the hook B is pivoted on a pin, $f$, and between which, near the other end of the stock, a lock-lever, C, is pivoted, at $g$. The stock has, also, projections, $a\ a$, between which the point $d$ of the hook enters, (as shown in fig. 1,) when the hook is closed, thereby retaining the draught-ring, eye, or loop, into which the hook engages, without the possibility of escape till the hook is unlocked.

The hook B has a long shank, $b$, and locks under the point $h$ of the lock-lever C, whose long arm $c$ extends further forward, and bears against the stock, to prevent the hook from unlocking. Thus, not only has the draught on the hook very little tendency to raise the shank out of place, but, when the lock-lever is in position, as shown in fig. 1, the hook cannot be unlocked. When, however, it is desired to unlock the hook, the lock-lever C is raised to the position indicated by red lines in fig. 3. The shank $b$ of the hook is set free by being brought opposite to a portion, $i$, of the lever nearer to its centre, $g$, and then the draught on the hook throws it open into the position indicated by red lines in the same figure. This unlocking is readily effected, even while the draught is in full force, on account of the great leverage exerted on the long arm of the lock-lever C, and the small leverage on the hook to oppose the unlocking.

What I claim as my invention, and desire to secure by Letters Patent, is—

The combined construction and arrangement of the stock A, hook B, and lock-lever C, substantially as and for the purpose herein specified.

The above specification of my improved safety-hook signed by me, this 15th day of April, 1868.

L. H. PFLEEGOR.

Witnesses:
J. S. BROWN,
WM. F. BROWNE.